Feb. 5, 1957
M. H. HICKEY ET AL
2,780,368
TRIPPER SEALING MEANS
Filed Dec. 1, 1955
3 Sheets-Sheet 1
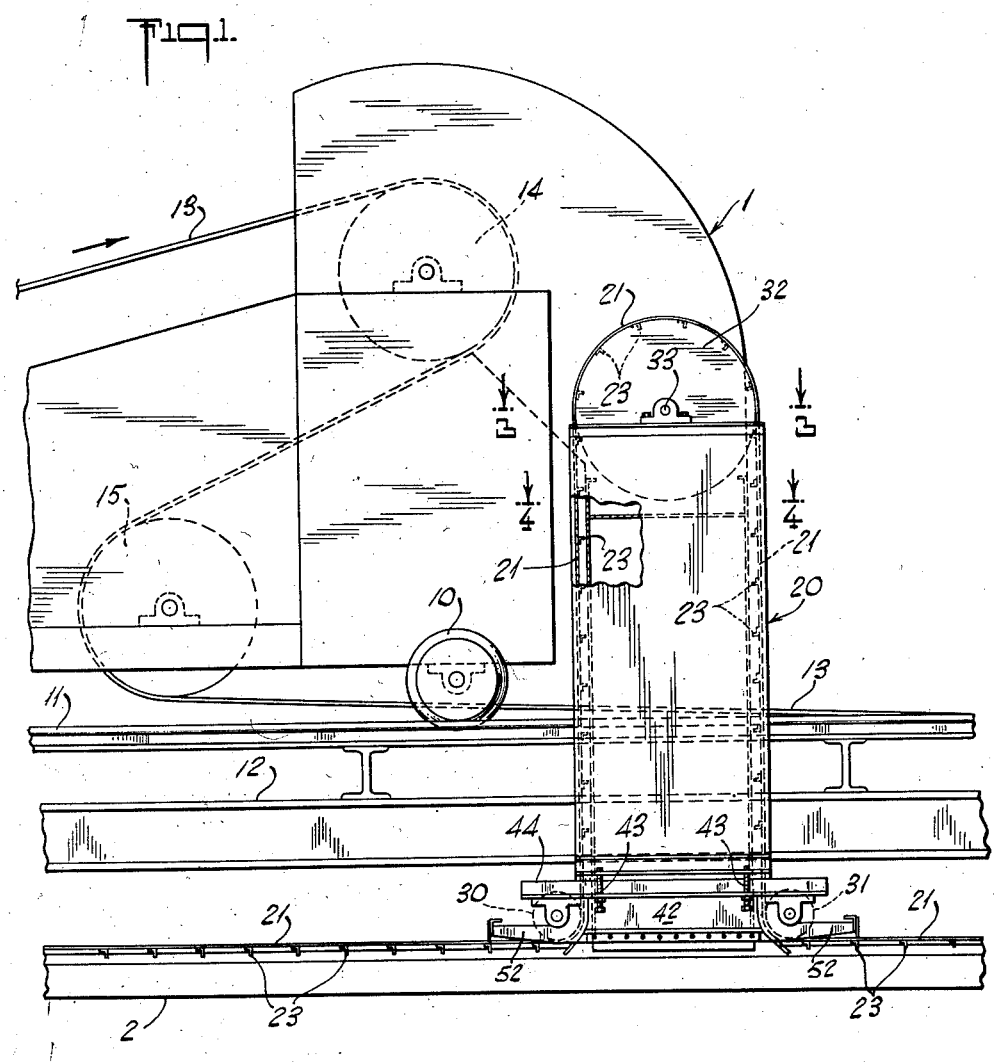
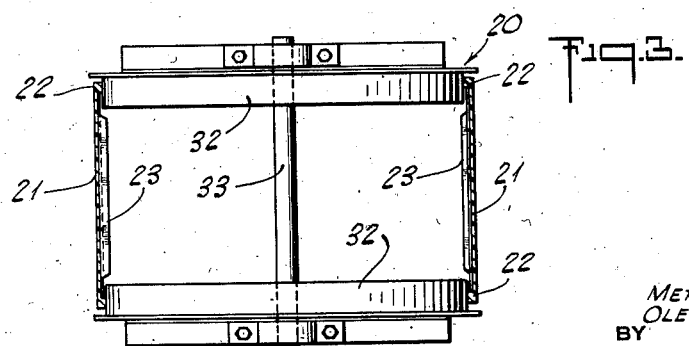
INVENTORS
MERRILL H. HICKEY
OLE M. BOLME
BY
ATTORNEYS Feb. 5, 1957 M. H. HICKEY ET AL 2,780,368
TRIPPER SEALING MEANS
Filed Dec. 1, 1955 3 Sheets-Sheet 2
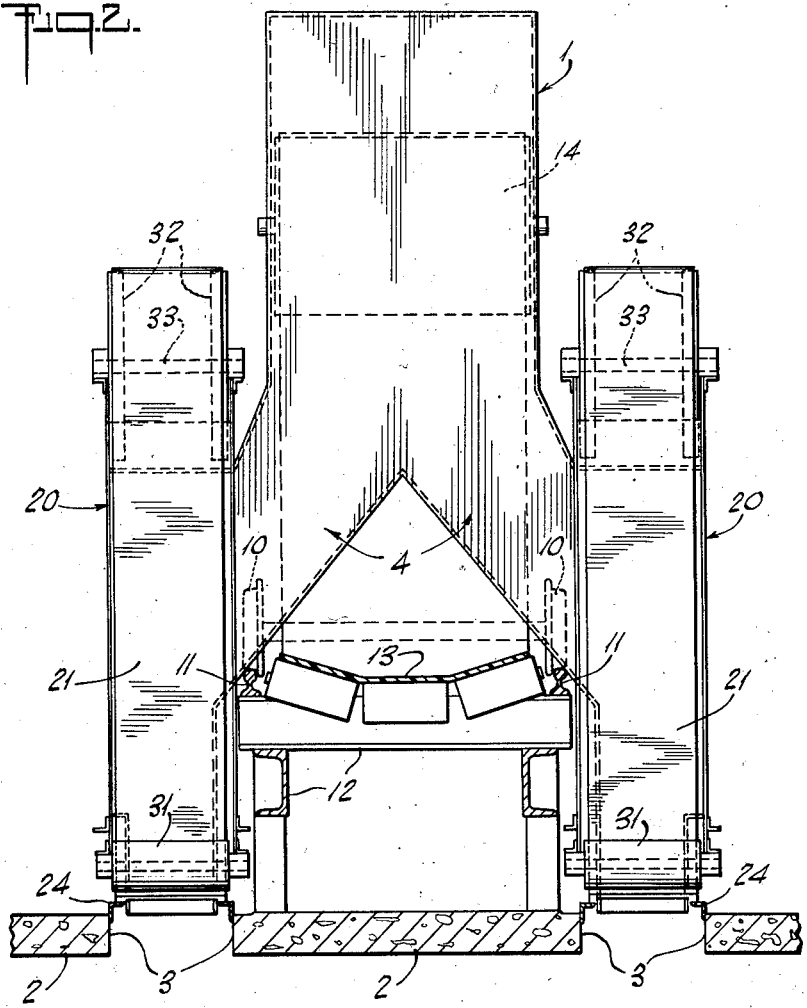
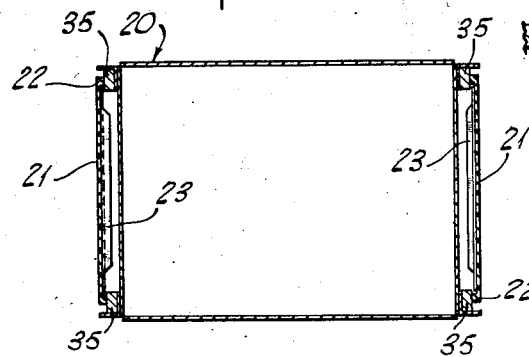
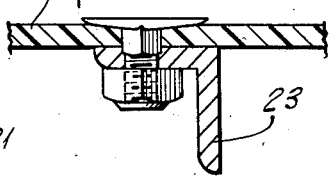
INVENTORS
MERRILL H. HICKEY
OLE M. BOLME
BY
Burgess, Ryan, & Hicks
ATTORNEYS Feb. 5, 1957          M. H. HICKEY ET AL          2,780,368
                      TRIPPER SEALING MEANS
Filed Dec. 1, 1955                              3 Sheets-Sheet 3
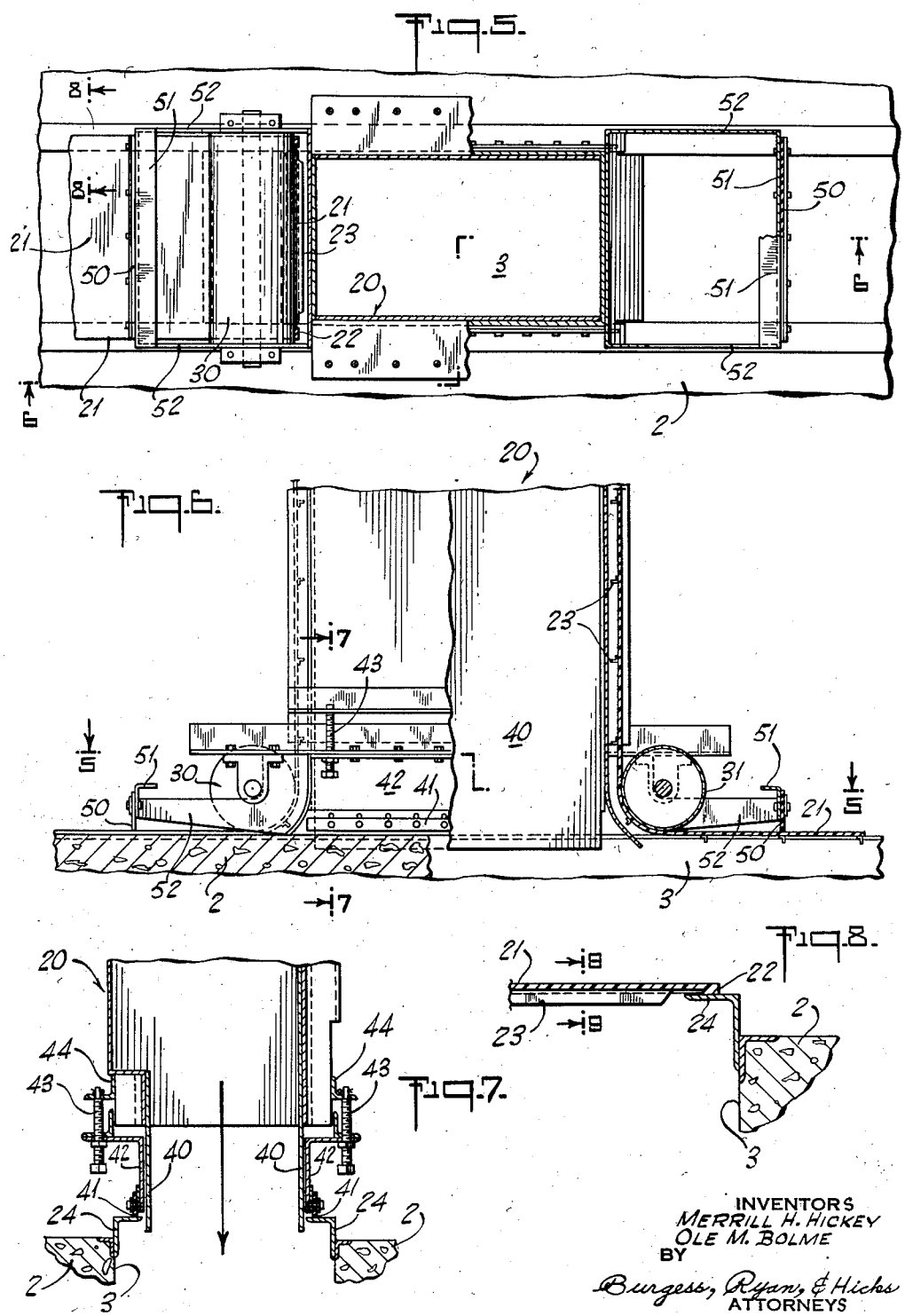
INVENTORS
MERRILL H. HICKEY
OLE M. BOLME
BY
Burgess, Ryan, & Hicks
ATTORNEYS United States Patent Office
2,780,368
Patented Feb. 5, 1957

2,780,368

TRIPPER SEALING MEANS

Merrill H. Hickey, Eggertsville, N. Y., and Ole M. Bohne, Newark, N. J., assignors to Hewitt-Robins Incorporated, Stamford, Conn., a corporation of New York Application December 1, 1955, Serial No. 550,309

2 Claims. (Cl. 214—17)

This invention relates to apparatus of the kind in which coal, ore or the like is loaded into bins or storage spaces by means of a traveling tripper. One form of such apparatus is described and illustrated in Patent No. 2,274,825, dated March 3, 1942.

The general arrangement contemplated includes a bin or other storage space which is provided with an elongated opening at the top, extending throughout the length of the particular storage space. Designed to run on tracks above the bin opening is a tripper which has a chute having a portion located to discharge material into the bin opening as the tripper travels the length of the bin.

It has been proposed heretofore (as in the aforesaid patent) to seal the bin opening on each side of the said discharge chute portion by means of a stationary belt spanning and covering the bin opening. A length of the bin opening sufficient to receive the discharge from the tripper chute is maintained open at all times by having the belt extend up and over the chute in more or less sealing engagement with it or with its associated structure. The belt is trained over pulleys which travel with the tripper, so that the bin is always open at the point where the chute discharges.

The general object of the present invention is to provide a novel form and arrangement of sealing belt which is capable of spanning the bin opening without support from beneath, as by gratings (as in the said patent).

As will later be apparent, the invention centers around the provision of a belt of special construction having transverse stiffeners attached to it and a novel arrangement of pulleys by which such a belt can be guided up and around the tripper chute while maintaining the desired dust seal.

In the accompanying drawings which illustrate a preferred form of the invention:

Fig. 1 is a broken-out side elevation, partially sectioned, of a portion of a tripper installation incorporating the invention;

Fig. 2 is an end elevation, partially sectioned, of the same installation;

Fig. 3 is a horizontal section on the line 3—3 of Fig. 1;

Fig. 4 is a horizontal section on the line 4—4 of Fig. 1;

Fig. 5 is a horizontal section on the line 5—5 of Fig. 6;

Fig. 6 is a vertical section on the line 6—6 of Fig. 5;

Fig. 7 is a vertical section on the line 7—7 of Fig. 6;

Fig. 8 is a fragmentary vertical section on the line 8—8 of Fig. 5; and

Fig. 9 is an enlarged section on the line 9—9 of Fig. 8.

The function of the tripper, generally designated 1, is to fill a bin or other storage space represented by the showing of its top wall 2. Extending the length of the bin are charging openings 3, one in each side of the tripper, into which the material delivered by the tripper is dumped by way of chutes, generally designated 4, one for each charging opening (see Fig. 2).

As usual, the tripper consists generally of a truck having wheels 10, running on rails 11 mounted on a suitable supporting structure 12. The tripper belt 13 is trained over tripper pulleys 14, 15 (Fig. 1) so that material dumped from the belt as it passes over the top pulley 14 falls down and laterally out through the chutes 4 into the charging openings in the bin.

Each chute includes a vertical portion or housing 20 located directly over a limited length of one of the bin openings and the balance of each opening is dust sealed by a belt 21 constructed and arranged as described below. It will be seen that the chute structures and sealing belt arrangements are duplicated and hence the detailed description of one will serve for both.

The sealing belt 21 has a flat bead or thickened portion 22 (see Fig. 8) extending along each edge and spaced longitudinally of the belt on its under side are transverse stiffeners 23 extending between the edge beads of the belt. Each stiffener is shown (Fig. 9) as constituted by an angle iron bolted or riveted to the belt. The belt beads seat on angles 24 mounted along the edges of the bin openings, the beads forming an effective dust seal and the stiffeners holding the belt against sagging across the width of the bin openings. As usual, of course, the ends of the sealing belt are suitably anchored.

The vertical chute portion or housing 20, which is a box-like structure open at its upper and lower ends, incorporates pulley means arranged to direct the sealing belt up and over the vertical chute portion and in such a way as to seal it, while leaving unobstructed the passage for the flow of material as described above. These pulley means comprise lower pulleys 30, 31 mounted at the base of the housing 20 and narrow, spaced pulleys 32 supported on shaft 33 at the upper end of the housing, these latter pulleys being engaged by the belt beads (see Fig. 3). As shown in Fig. 4, vertically disposed wooden guide studs 35 are arranged on the outside of the chute portion or housing 20, one in each corner, and they likewise serve to engage the belt beads. As their upper ends these studs may terminate close to and be shaped to fit the curvature of the top pulleys so as to minimize the escape of dust in that vicinity.

At its lower end, the sides of the structure 20 are sealed as illustrated in Fig. 7. Side wall extensions 40 depend from the structure 20 in close proximity to the inner edges of the angles 24 and the top faces of these angles are engaged by sealing strips 41. As indicated, these strips are supported by angle members 42 which, by bolts 43, are adjustably hung from angles 44 secured to the housing side walls.

Additional sealing strips 50 are shown secured to angles 51 supported by the arms 52 projecting forwardly and rearwardly from the base of the chute structure 20. These strips, as will be seen, engage the upper surface of the sealing belt in the vicinity of the lower pulleys 30, 31.

It will thus be seen that the bin openings are effectively sealed throughout their length; also that, since the sealing belt is self-supporting widthwise of the bin openings, the vertical discharge path of the material from the tripper into the bin (indicated by the arrow in Fig. 7) is entirely unobstructed.

In the light of the foregoing detailed description of the preferred form of the invention, the following is claimed:

1. In an apparatus of the kind described including a bin having an elongated charging opening, a tripper structure mounted for travel longitudinally of such opening and incorporating a chute portion disposed to discharge into a limited length of the charging opening, the improvement which comprises: a sealing belt having a flat bead along each edge portion on the underside of the belt adapted to seat on the bin to seal the said opening on each side of the said chute portion; longitudinally spaced, transverse stiffeners secured to the underside of the sealing belt between its said beads; and pulley means associated with the said chute portion located to guide the sealing belt up and over the chute portion, including a pair of top pulleys spaced apart on a common axis and dimensioned to engage the said belt beads.

2. The improvement set forth in claim 1 in which stretches of the sealing belt are disposed vertically on each side of the said top pulleys and in which the said chute portion is provided with guides adapted to engage the belt beads throughout the vertical stretches of the belt.

No references cited.